(12) United States Patent
Anand et al.

(10) Patent No.: US 10,025,584 B2
(45) Date of Patent: Jul. 17, 2018

(54) FIRMWARE MANAGEMENT OF SR-IOV ADAPTERS

(71) Applicant: International Business Machines Corporation, Armonk, NY (US)

(72) Inventors: Manu Anand, Hyderabad (IN); Jesse P. Arroyo, Rochester, MN (US); Charles S. Graham, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/056,226

(22) Filed: Feb. 29, 2016

(65) Prior Publication Data

US 2017/0249136 A1  Aug. 31, 2017

(51) Int. Cl.
*G06F 9/44* (2018.01)
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45583* (2013.01)

(58) Field of Classification Search
None
See application file for complete search history.

(56) References Cited

U.S. PATENT DOCUMENTS 7,039,692 B2    5/2006  Foster et al.
7,209,994 B1    4/2007  Klaiber et al.
(Continued)

FOREIGN PATENT DOCUMENTS

CN    101488092 A    7/2009
CN    104737138 A    6/2015
(Continued)

OTHER PUBLICATIONS

Oracle, "Updating the Universal HBA Firmware." Oracle Docs, Sep. 15, 2013, docs.oracle.com/cd/E24650_01/html/E24461/z40004591045586.html. Accessed Oct. 23, 2017.*
(Continued)

*Primary Examiner* — Wei Zhen
*Assistant Examiner* — Binh Luu
(74) *Attorney, Agent, or Firm* — Joseph D. Downing; Robert R. Williams; Kennedy Lenart Spraggins LLP

(57) ABSTRACT

Firmware management of SR-IOV adapters in a computing system includes: receiving, by a hypervisor, a request to update a hypervisor-hosted firmware image including replacing a firmware image previously stored in a reserved memory space of the hypervisor with a replacement firmware image, where the hypervisor-hosted firmware image includes an SR-IOV adapter firmware image configured for installation on SR-IOV adapters of a particular type; determining whether all SR-IOV adapters of the particular type in the computing system have been updated to the previously stored firmware image; and updating the hypervisor-hosted firmware image only if all SR-IOV adapters of the particular type in the computing system have been updated to the previously stored firmware image, including replacing, in the reserved memory space, the previously stored firmware image with the replacement firmware image.

18 Claims, 4 Drawing Sheets

(56) References Cited

U.S. PATENT DOCUMENTS

| | | |
|---|---|---|
| 7,240,364 B1 | 7/2007 | Branscomb et al. |
| 7,574,537 B2 | 8/2009 | Arndt et al. |
| 7,613,898 B2 | 11/2009 | Haertel et al. |
| 7,734,843 B2 | 6/2010 | Bender et al. |
| 7,813,366 B2 | 10/2010 | Freimuth et al. |
| 7,882,326 B2 | 2/2011 | Armstrong et al. |
| 7,937,518 B2 | 5/2011 | Boyd et al. |
| 7,984,262 B2 | 7/2011 | Battista et al. |
| 8,219,988 B2 | 7/2012 | Armstrong et al. |
| 8,321,722 B2 | 11/2012 | Tanaka et al. |
| 8,327,086 B2 | 12/2012 | Jacobs et al. |
| 8,429,446 B2 | 4/2013 | Hara et al. |
| 8,533,713 B2 | 9/2013 | Dong |
| 8,561,065 B2 | 10/2013 | Cunningham et al. |
| 8,561,066 B2 | 10/2013 | Koch et al. |
| 8,607,230 B2 | 12/2013 | Hatta et al. |
| 8,621,120 B2 | 12/2013 | Bender et al. |
| 8,645,755 B2 | 2/2014 | Brownlow et al. |
| 8,677,356 B2 | 3/2014 | Jacobs et al. |
| 8,683,109 B2 | 3/2014 | Nakayama et al. |
| 8,875,124 B2 | 10/2014 | Kuzmack et al. |
| 8,984,240 B2 | 3/2015 | Aslot et al. |
| 9,032,122 B2 | 5/2015 | Hart et al. |
| 9,047,113 B2 | 6/2015 | Iwamatsu et al. |
| 9,304,849 B2 | 4/2016 | Arroyo et al. |
| 9,317,317 B2 | 4/2016 | Graham et al. |
| 9,473,400 B1 | 10/2016 | DeVilbiss et al. |
| 9,501,308 B2 | 11/2016 | Arroyo et al. |
| 9,552,233 B1 | 1/2017 | Tsirkin et al. |
| 9,715,469 B1 | 7/2017 | Arroyo et al. |
| 9,720,862 B1 | 8/2017 | Arroyo et al. |
| 9,720,863 B1 | 8/2017 | Arroyo et al. |
| 9,740,647 B1 | 8/2017 | Arroyo et al. |
| 9,760,512 B1 | 9/2017 | Arroyo et al. |
| 9,785,451 B1 | 10/2017 | Arroyo et al. |
| 2002/0083258 A1 | 6/2002 | Bauman et al. |
| 2003/0050990 A1 | 3/2003 | Craddock et al. |
| 2003/0101377 A1 | 5/2003 | Dawkins et al. |
| 2003/0204648 A1 | 10/2003 | Arndt |
| 2004/0064601 A1 | 4/2004 | Swanberg |
| 2004/0205272 A1 | 10/2004 | Armstrong et al. |
| 2004/0243994 A1* | 12/2004 | Nasu .......... G06F 8/65 717/171 |
| 2006/0095624 A1 | 5/2006 | Raj et al. |
| 2006/0179177 A1 | 8/2006 | Arndt et al. |
| 2006/0195618 A1 | 8/2006 | Arndt et al. |
| 2006/0195620 A1 | 8/2006 | Arndt et al. |
| 2006/0281630 A1 | 12/2006 | Bailey et al. |
| 2007/0157197 A1 | 7/2007 | Neiger et al. |
| 2007/0260768 A1 | 11/2007 | Bender et al. |
| 2008/0005383 A1 | 1/2008 | Bender et al. |
| 2008/0114916 A1 | 5/2008 | Hummel et al. |
| 2008/0147887 A1 | 6/2008 | Freimuth et al. |
| 2009/0007121 A1 | 1/2009 | Yamada et al. |
| 2009/0037941 A1* | 2/2009 | Armstrong .......... G06F 12/1475 719/328 |
| 2009/0083467 A1 | 3/2009 | Giles et al. |
| 2009/0133016 A1 | 5/2009 | Brown et al. |
| 2009/0133028 A1 | 5/2009 | Brown et al. |
| 2009/0249366 A1 | 10/2009 | Sen et al. |
| 2009/0276551 A1 | 11/2009 | Brown et al. |
| 2009/0276773 A1 | 11/2009 | Brown et al. |
| 2010/0036995 A1 | 2/2010 | Nakayama et al. |
| 2010/0250824 A1 | 9/2010 | Belay |
| 2010/0262727 A1 | 10/2010 | Arndt |
| 2011/0197003 A1 | 8/2011 | Serebrin et al. |
| 2011/0320860 A1 | 12/2011 | Coneski et al. |
| 2012/0042034 A1 | 2/2012 | Goggin et al. |
| 2012/0131232 A1 | 5/2012 | Brownlow et al. |
| 2012/0131576 A1 | 5/2012 | Hatta et al. |
| 2012/0137288 A1 | 5/2012 | Barrett et al. |
| 2012/0137292 A1 | 5/2012 | Iwamatsu et al. |
| 2012/0151473 A1* | 6/2012 | Koch .......... G06F 9/45558 718/1 |
| 2012/0167082 A1 | 6/2012 | Kumar et al. |
| 2012/0179932 A1* | 7/2012 | Armstrong .......... G06F 11/20 714/4.11 |
| 2012/0191935 A1 | 7/2012 | Oberly, III et al. |
| 2012/0198187 A1 | 8/2012 | Accapadi et al. |
| 2012/0246644 A1 | 9/2012 | Hattori et al. |
| 2012/0265910 A1 | 10/2012 | Galles et al. |
| 2012/0297379 A1 | 11/2012 | Anderson et al. |
| 2012/0303594 A1 | 11/2012 | Mewhinney et al. |
| 2013/0086298 A1 | 4/2013 | Alanis et al. |
| 2013/0159572 A1 | 6/2013 | Graham et al. |
| 2013/0160002 A1 | 6/2013 | Graham et al. |
| 2013/0191821 A1 | 7/2013 | Armstrong et al. |
| 2013/0268800 A1 | 10/2013 | Rangaiah |
| 2014/0122760 A1 | 5/2014 | Grisenthwaite et al. |
| 2014/0149985 A1 | 5/2014 | Takeuchi |
| 2014/0181801 A1* | 6/2014 | Voronkov .......... G06F 8/63 717/177 |
| 2014/0229769 A1* | 8/2014 | Abraham .......... G06F 13/102 714/43 |
| 2014/0245296 A1* | 8/2014 | Sethuramalingam .......... G06F 9/45533 718/1 |
| 2014/0258570 A1 | 9/2014 | Eide et al. |
| 2014/0281263 A1 | 9/2014 | Deming et al. |
| 2014/0351471 A1 | 11/2014 | Jebson et al. |
| 2014/0372739 A1 | 12/2014 | Arroyo et al. |
| 2014/0372789 A1 | 12/2014 | Arroyo et al. |
| 2014/0372795 A1 | 12/2014 | Graham et al. |
| 2014/0372801 A1 | 12/2014 | Graham et al. |
| 2015/0006846 A1* | 1/2015 | Youngworth .......... G06F 3/0689 711/216 |
| 2015/0052282 A1 | 2/2015 | Dong |
| 2015/0120969 A1 | 4/2015 | He et al. |
| 2015/0193248 A1 | 7/2015 | Noel et al. |
| 2015/0193250 A1 | 7/2015 | Ito et al. |
| 2015/0229524 A1 | 8/2015 | Engebretsen et al. |
| 2015/0301844 A1 | 10/2015 | Droux et al. |
| 2015/0317274 A1 | 11/2015 | Arroyo et al. |
| 2015/0317275 A1 | 11/2015 | Arroyo et al. |
| 2016/0019078 A1 | 1/2016 | Challa et al. |
| 2016/0246540 A1 | 8/2016 | Blagodurov et al. |
| 2016/0350097 A1* | 12/2016 | Mahapatra .......... G06F 8/665 |
| 2017/0046184 A1 | 2/2017 | Tsirkin et al. |
| 2017/0199768 A1* | 7/2017 | Arroyo .......... G06F 9/45558 |
| 2017/0242720 A1* | 8/2017 | Anand .......... G06F 9/45558 |
| 2017/0242756 A1 | 8/2017 | Arroyo et al. |
| 2017/0242763 A1 | 8/2017 | Arroyo et al. |

FOREIGN PATENT DOCUMENTS

| | | |
|---|---|---|
| JP | 2012-113660 A | 6/2012 |
| JP | 5001818 B | 8/2012 |

OTHER PUBLICATIONS

Xu et al., *SRVM: Hypervisor Support for Live Migration with Passthrough SR-IOV Network Devices*, Proceedings of the 12th ACM SIGPLAN/SIGOPS International Conference on Virtual Execution Environments (VEE'16), Apr. 2016, pp. 65-77, ACM New York, NY, USA.

Huang et al., *Nomad: Migrating OS-bypass Networks in Virtual Machines*, Proceedings of the 3rd International Conference on Virtual Execution Environments (VEE'07), Jun. 2007, pp. 158-68, ACM New York, NY, USA.

Appendix P; List of IBM Patent or Applications Treated as Related, May 26, 2017, 2 pages.

Axnix et al. "IBM z13 firmware innovations for simultaneous multithreading and I/O virtualization", IBM Journal of Research and Development, Jul./Sep. 2015, vol. 59, No. 4/5, 11-1, International Business Machines Corporation (IBM), Armonk, NY.

Salapura et al., "Resilient cloud computing", IBM Journal of Research and Development, Sep./Oct. 2013, vol. 57, No. 5, 10-1, 12 pages, International Business Machines Corporation (IBM), Armonk, NY.

Challa, "Hardware Based I/O Virtualization Technologies for Hypervisors, Configurations and Advantages—A Study", 2012

(56) References Cited

OTHER PUBLICATIONS

IEEE International Conference on Cloud Computing in Emerging Markets (CCEM), Oct. 2012, pp. 99-103, IEEE Xplore Digital Library (online), DOI: 10.1109/CCEM.2012.6354610.
Xu et al., "Multi-Root I/O Virtualization Based Redundant Systems", 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS.2014.7044652.
Appendix P; List of IBM Patent or Applications Treated as Related, Jan. 4, 2017, 2 pages.
Ajila et al., "Efficient Live Wide Area VM Migration With IP Address Change Using Type II Hypervisor", 2013 IEEE 14th International Conference on Information Reuse and Integration (IRI2013), Aug. 2013, pp. 372-379, IEEE Xplore Digital Library (online), DOI: 10.1109/IRI.2013.6642495.
PCI-SIG, "Single Root I/O Virtualization and Sharing Specification-Revision 1.0", Sep. 2007, PCI-SIG Specifications Library, pcisig.com (online), URL: pcisig.com/specifications/iov/single_root/.
U.S. Appl. No. 15/299,512, to Jesse P. Arroyo et al., entitled, *Migrating MMIO From a Source I/O Adapter of a Computing System to a Destination I/O Adapter of the Computing System*, assigned to International Business Machines Corporation, 35 pages, filed Oct. 21, 2016.
U.S. Appl. No. 15/467,183, to Jesse P. Arroyo et al., entitled, *Migrating Interrupts From a Source I/O Adapter of a Computing System to a Destination I/O Adapter of the Computing System*, assigned to International Business Machines Corporation, 35 pages, filed Mar. 23, 2017.
U.S. Appl. No. 15/467,025, to Jesse P. Arroyo et al., entitled, *Migrating Interrupts From a Source I/O Adapter of a Source Computing System to a Destination I/O Adapter of a Destination Computing System* assigned to International Business Machines Corporation, 38 pages, filed Mar. 23, 2017.
U.S. Appl. No. 15/467,052, to Jesse P. Arroyo et al., entitled, *Migrating MMIO From a Source I/O Adapter of a Source Computing System to a Destination I/O Adapter of a Destination Computing System*, assigned to International Business Machines Corporation, 38 pages, filed Mar. 23, 2017.
U.S. Appl. No. 15/617,170, to Jesse P. Arroyo et al., entitled, *Migrating MMIO From a Source I/O Adapter of a Computing System to a Destination I/O Adapter of the Computing System*, assigned to International Business Machines Corporation, 36 pages, filed Jun. 8, 2017.
Appendix P; List of IBM Patent or Applications Treated as Related, Jul. 19, 2017, 2 pages.
Lynch, *Live Partition Mobility*, Presentation, Nov. 11, 2014, 30 pages, Forsythe (online), <http://www.circle4.com/forsythe/lpm2014.pdf>.
U.S. Appl. No. 15/806,590, to Jesse P. Arroyo et al., entitled, *Migrating MMIO From a Source I/O Adapter of a Source Computing System to a Destination I/O Adapter of a Destination Computing System*, assigned to International Business Machines Corporation, 38 pages, filed Nov. 8, 2017.
U.S. Appl. No. 15/807,638, to Jesse P. Arroyo et al., entitled, *Migrating Interrupts From a Source I/O Adapter of a Computing System to a Destination I/O Adapter of the Computing System*, assigned to International Business Machines Corporation, 28 pages, filed Nov. 8, 2017.
Appendix P; List of IBM Patent or Applications Treated as Related, Jan. 12, 2018, 2 pages.

* cited by examiner

FIRMWARE MANAGEMENT OF SR-IOV ADAPTERS

BACKGROUND

Field of the Invention

The field of the invention is data processing, or, more specifically, methods, apparatus, and products for firmware management of SR-IOV ('single-root I/O virtualization) adapters in a computing system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data centers providing cloud services with various types of virtualization services. Regardless of the particular type of virtualization service being offered, most virtualization services make use of massive amounts of data I/O traffic and network bandwidth. In such a computing environment, each computing system may include many I/O adapters and such adapters may be mapped to logical partition hosted on the computing system and supported by a hypervisor. Maintaining firmware including updating the firmware, for many such network adapters may be resource intensive. For example, in some computing systems, a hypervisor may instantiate an adjunct partition for each I/O adapter where the adjunct partition performs management operations for the I/O adapter. Each of the adjunct partitions in such an environment may be configured with a complete copy of firmware for the I/O adapter associated with the adjunct partition. In this way, in a system with many I/O adapters of the same will require many identical copies of firmware. Further, in such hypervisor-driven systems, the adapter firmware is typically provided as part of the system firmware as a whole including the hypervisor firmware. Such system firmware updates may not be released on the same schedule as I/O adapter firmware and may also require a great deal of verification before release.

SUMMARY

Methods, apparatus, and products of firmware management of SR-IOV ('single-root I/O virtualization) adapters in a computing system are disclosed in this specification. Such firmware management may include: receiving, by a hypervisor, a request to update a hypervisor-hosted firmware image including replacing a firmware image previously stored in a reserved memory space of the hypervisor with a replacement firmware image, where the hypervisor-hosted firmware image includes an SR-IOV adapter firmware image configured for installation on SR-IOV adapters of a particular type; determining whether all SR-IOV adapters of the particular type in the computing system have been updated to the previously stored firmware image; and updating the hypervisor-hosted firmware image only if all SR-IOV adapters of the particular type in the computing system have been updated to the previously stored firmware image, including replacing, in the reserved memory space, the previously stored firmware image with the replacement firmware image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
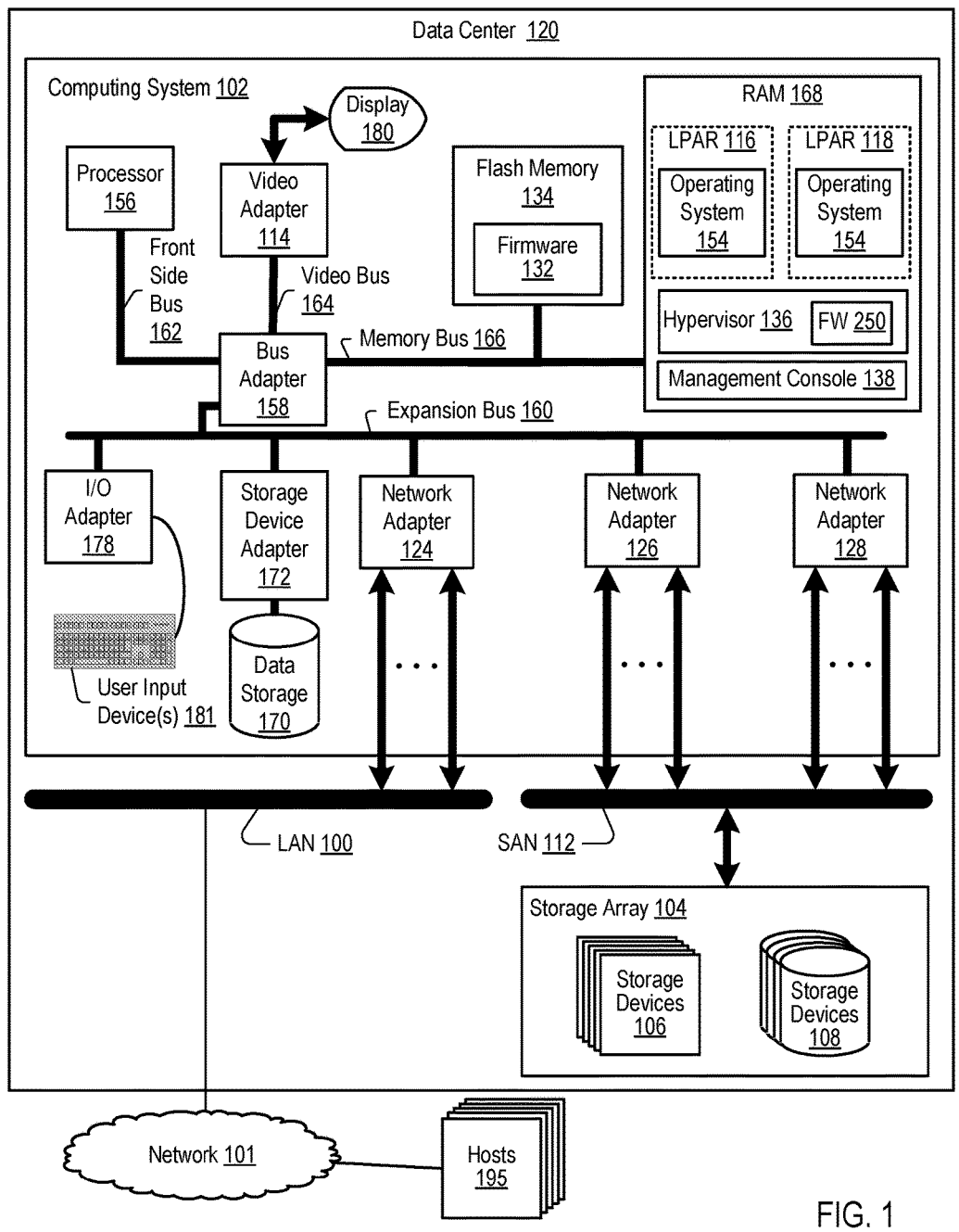
FIG. 1 sets forth an example computing environment configured for firmware management of SR-IOV adapters.

Embodiments of methods, apparatus, and computer program products for firmware management of SR-IOV adapters are described with reference to the accompanying drawings, beginning with FIG. 1. FIG. 1 sets forth an example computing environment configured for firmware management of SR-IOV adapters. The example environment of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for firmware management of SR-IOV adapters. The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients.

Also stored in RAM (168) are two instances of an operating system (154), one for each logical partition (116, 118). Operating systems useful in computers configured for firmware management of SR-IOV adapters according to various embodiments include UNIX™, Linux™, Microsoft Windows™, AIX™, IBM's I™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for firmware management of SR-IOV adapters according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition. Although referred to as a 'virtual' function, readers of skill in the art will recognize that a VF is in fact a physical channel that is not a resource virtualized entirely by the hypervisor.

Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (100, 101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for firmware management of SR-IOV adapters according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices, such as storage devices (106) and storage devices (108).

In the example of FIG. 1, the hypervisor (136) may be configured for firmware management of the SR-IOV adapters (124, 126, 128). In embodiments of the present disclosure, the hypervisor (136) is configured to maintain, in a reserved memory space, a firmware image for SR-IOV adapters of a particular type. Adapters are of the same 'particular type' if the adapters are configured to support the same firmware. Examples of adapters of the same particular type may include adapters having a similar model, adapters having a similar vendor or manufacturer, adapters having a similar functional capacity, and so on as will occur to readers of skill in the art.

In the example of FIG. 1, from time to time, the hypervisor-hosted firmware image (250) may be updated. Consider, for example, that the hypervisor-hosted firmware image is a version 1.0 firmware image for the network adapters (124, 126, and 128) which are of the same particular type. For various reasons, the vendor or manufacturer of the adapters may generate a firmware update to version 1.1. In such an embodiment, the version 1.0 hypervisor-hosted firmware (250)—which, as explained below in greater detail is utilized to upgrade the firmware of the network adapters (124, 126, 128)—may be upgraded to version 1.1.

To that end, the hypervisor (136) in the example of FIG. 1 may be configured to receive a request to update a hypervisor-hosted firmware image (250) including replacing a firmware image previously stored in a reserved memory space of the hypervisor with a replacement firmware image. Such a request may be received from a variety of sources through a variety of channels. The hypervisor (136), for example, may receive the request through the management console (138) as a result of user input in a management application, or through a periodic check performed by such a management application for updates to the SR-IOV adapter firmware.

Responsive to the request, the hypervisor (136) may determine whether all SR-IOV adapters of the particular type in the computing system have been updated to the previously stored firmware image. If all adapters in the system have not been updated, it is an indication that at least one of the adapters should be updated to the current version of the hypervisor-hosted firmware prior to updating the hypervisor host firmware itself to a new version. In essence, the hypervisor will update the hypervisor-hosted firmware image only if all SR-IOV adapters of the particular type in the computing system have been updated to the previously stored firmware image. Such updating includes replacing, in the reserved memory space, the previously stored firmware image with a replacement firmware image.

Figure 2:
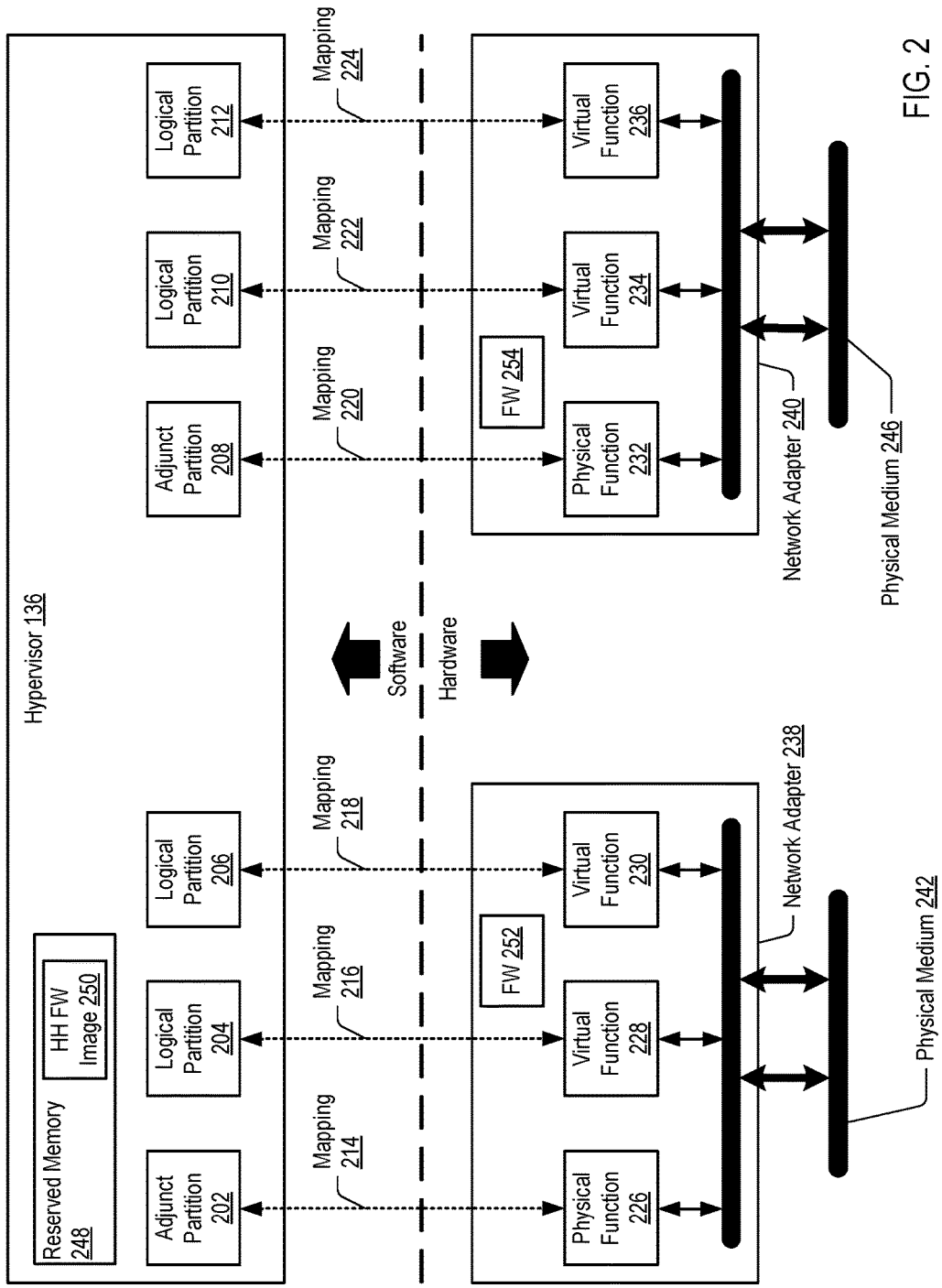
FIG. 2 sets forth an example system in which logical partitions are mapped to virtual functions exposed by SR-IOV adapters and the system is configured for firmware management of the SR-IOV adapters.

For further explanation, FIG. 2 sets forth an example system in which logical partitions are mapped to virtual functions exposed by SR-IOV adapters and the system is configured for firmware management of the SR-IOV adapters. The example system of FIG. 2 includes a hypervisor (136) that is coupled for data communications over a physical medium (242, 246) through one or more network adapters (238, 240). The hypervisor (136) of the system in the example of FIG. 2 supports execution of several logical partitions (204, 206, 210, 212) and several adjunct partitions (202, 208). Each logical partition (204, 206, 210, 212) is mapped (216, 218, 222, 224) to a respective virtual function (228, 230, 234, 236) exposed by an SR-IOV network adapter (238, 240). The logical partitions (238, 240) in the example of FIG. 2 may be mapped (216, 218, 222, 224) to the virtual functions (228, 230, 234, 236) exposed by network adapters (238, 240) with: information for identifying a PCIe slot for the network adapter for a virtual function; specifications of direct memory access (DMA) memory space; mappings for memory mapped input output (MMIO); and other configurations or settings that enable a given logical partition to communicate and use physical resources by interfacing with a given virtual function on a network adapter. Such mappings are generally maintained by the hypervisor (136) and an adjunct partition (202, 208) for each adapter (238, 240).

An adjunct partition as the term is used in this specification refers to a partition instantiated by a hypervisor and configured for management of SR-IOV adapter resources, including various configuration parameters of virtual functions (228, 230, 234, 236) exposed by a network adapter (238, 240). In some embodiments, for example, each adjunct partition (202, 208) is associated and mapped (214, 220) with a physical function (226, 232) of a discrete network adapter (238, 240). The adjunct partition may include, in addition to a kernel, a driver for managing a network adapter through a management channel specified in the protocol for the network adapter.

One management function adjunct partitions (202, 208) performed in prior art systems is maintenance of firmware for the adapter mapped to the adjunct partition. To that end, in prior art systems, each adjunct partition included an instance of the firmware image for the network adapter to which the adjunct partition is mapped. With many adapters of the same type in a single system, the storage of a separate instance of the firmware image for each of the adapters does not scale. Further, the firmware image is typically of a large size relative to the size of an adjunct partition that does not need to store such a firmware image. Thus, having redundant instances of the same firmware image needlessly consumed memory space.

The example source system (250) of FIG. 2 may be configured for firmware management of the SR-IOV adapters. The hypervisor (136) and the adjunct partitions (202, 208) may each perform some firmware management in the system. The hypervisor for example may receive a request to update a hypervisor-hosted firmware image (250) where the request includes replacing a firmware image (250) previously stored in a reserved memory space (248) of the hypervisor (136) with a replacement firmware image. The hypervisor-hosted firmware image (250) is an SR-IOV adapter firmware image configured for installation on SR-IOV adapters of a particular type. In the example of FIG. 2, both network adapters (2380, 240) may be SR-IOV adapters of the same type. Each of the network adapters (238, 240) may have firmware (252, 254) executing on the network adapter.

The hypervisor, responsive to the request to update the hypervisor-hosted firmware image (250), may determine whether all SR-IOV adapters (238, 240) have been updated to the previously stored firmware image (250). Having each network adapter of the same type running the same firmware version provides predictability of behavior, stability, and security. As such, the network adapters in the example of FIG. 2 may be updated regularly and periodically to the most current available firmware version. Further, in some instances updating requires a particular path. Consider the following example: network adapter (238) is running firmware (252) version 1.0, network adapter (240) is running firmware (254) version 1.1, and the hypervisor replaces firmware version 1.1 in the reserved memory space (248) with firmware version 2.0. Consider, also that to update to version 2.0 of the firmware, a network adapter must first be updated to version 1.1. In such an example, the network adapter (238), running version 1.0 of the firmware, cannot update to the newly updated hypervisor-hosted firmware version 2.0 and version 1.1 is no longer available in the system.

To that end, the hypervisor (136) updates the hypervisor-hosted firmware image (250) only if all SR-IOV adapters (238, 240) of the particular type in the computing system have been updated to the previously stored firmware image. Such an update includes replacing, in the reserved memory space (248), the previously stored firmware image with a replacement firmware image.

Each adjunct partition (202, 208) may be responsible for determining when an update of firmware is ready for the SR-IOV adapter coupled to the adjunct partition. To that end, each adjunct partition (202, 208) may execute an SR-IOV driver which compares the hypervisor-hosted firmware image (250) to a firmware image (252, 254) installed on the SR-IOV adapter (238, 240) associated with the adjunct partition. If the comparison meets predefined update criteria, the SR-IOV driver may update the firmware image of the SR-IOV adapter associated with the adjunct partition with the hypervisor-hosted firmware image.

The predefined update criteria may specify different instances in which the firmware of an SR-IOV adapter is to be updated with a firmware version hosted by the hypervisor. In some embodiments, for example, the predefined update criteria may specify that an adjunct partition (and its SR-IOV driver) update the firmware of an SR-IOV adapter when the version of the firmware hosted by the hypervisor is newer than the version of the firmware currently installed on the network adapter. In some embodiments, the predefined update criteria may specify that an adjunct partition update the firmware of an SR-IOV adapter when the version of the firmware hosted by the hypervisor is different than the version of the firmware currently installed on the network adapter. In such an embodiment, roll-back of firmware from a newer version to a previous version is possible.

To update the firmware image of the SR-IOV adapter associated with the adjunct partition with the hypervisor-hosted firmware image (250), the adjunct partition (202) through the SR-IOV driver may lock the hypervisor-hosted firmware image from modification through a first hypervisor system call; copy the hypervisor-hosted firmware image to the SR-IOV adapter; and upon completing the update to the firmware image of the SR-IOV adapter, unlock the hypervisor-hosted firmware image from modification through a second hypervisor system call.

The adjunct partition updating firmware on an SR-IOV adapter locks the hypervisor-hosted firmware image from modification so that the hypervisor (136) does not update the version of firmware hosted by the hypervisor prior to the full update of the network adapter by the adjunct partition. To that end, the hypervisor (136) in addition to determining whether all network adapters are running the current version of the hypervisor-hosted firmware may also determine whether the hypervisor-hosted firmware has been locked from modification. If the hypervisor-hosted firmware has been locked from modification, the hypervisor may cease the update attempt or may wait a predefined period of time before again determining whether the firmware is locked.

Figure 3:
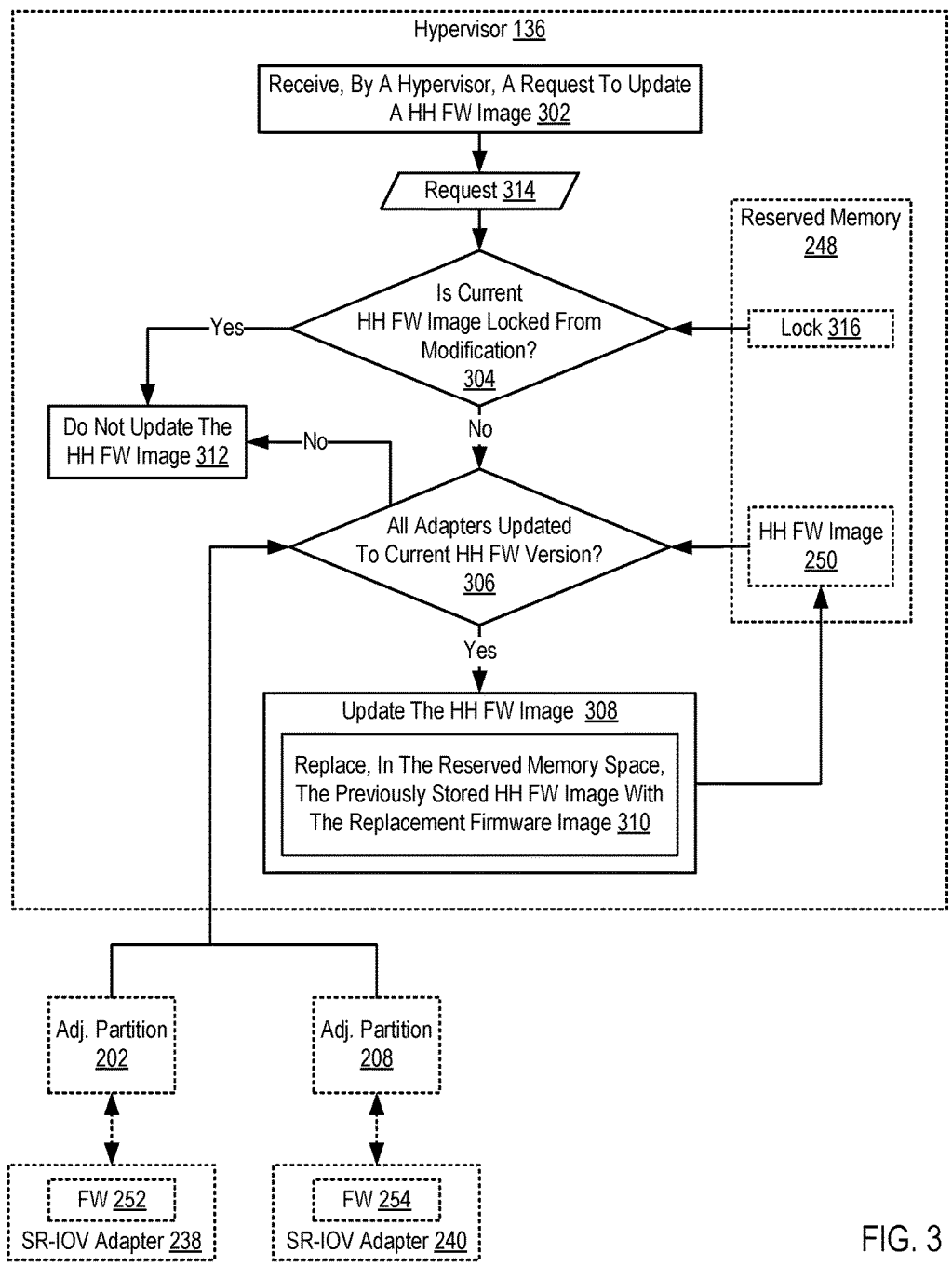
FIG. 3 sets forth a flow chart illustrating an exemplary method carried out by a hypervisor for firmware management of SR-IOV adapters in a computing system according to embodiments of the present disclosure.

For further explanation, FIG. 3 sets forth a flow chart illustrating an exemplary method carried out by a hypervisor for firmware management of SR-IOV adapters in a computing system according to embodiments of the present disclosure. The method of FIG. 3 includes receiving (302), by a hypervisor (136), a request (314) to update a hypervisor-hosted firmware image (250) including replacing a firmware image previously stored in a reserved memory space (248) of the hypervisor (136) with a replacement firmware image and where the hypervisor-hosted firmware image (250) is an SR-IOV adapter firmware image configured for installation on SR-IOV adapters of a particular type. Receiving (302) a request (314) a request to update a hypervisor-hosted firmware image (25) may be carried out in various ways including, receiving a user request through a management application and connection exposed by the hypervisor where the request indicates firmware version details and identifies a storage location or uniform resource locator (URL) at which to obtain the firmware image.

The method of FIG. 3 also includes determining (304) whether the current hypervisor-hosted firmware image (250) is locked from modification. Each adjunct partition (202, 208) when updating the firmware of the SR-IOV adapter (238, 240) with the hypervisor-hosted firmware image (250) may lock (316) the hypervisor-hosted firmware image from modification until completing the update on the SR-IOV adapter (238, 240). Such a lock (316) may be implemented in a variety of ways. A byte in which all bits are set to a logic high to indicate the lock is set and set to a logic low to indicate the lock is not set is, for example, one such implementation.

If the currently hypervisor-hosted firmware image is locked, the method of FIG. 3 continues by not updating (312) the hypervisor-hosted firmware image (250). If the hypervisor-hosted firmware image is not locked, however, the method of FIG. 3 continues by determining (306) whether all SR-IOV adapters of the particular type in the computing system have been updated to the previously stored firmware image. Determining (304) whether all SR-IOV adapters of the particular type have been updated to the previously stored firmware image may be carried out in a variety of ways including querying by the hypervisor the network adapters directly or querying an adjunct partition associated with each of the network adapters. Readers of skill in the art will recognize that determining (304) whether all SR-IOV adapters of the particular type have been updated to the previously stored firmware image may be implemented in some embodiments, but not implemented in others. That is, in some embodiments, the hypervisor may update the hypervisor-hosted firmware image without any regard to the current version of firmware of the network adapters.

If all SR-IOV adapters of the particular type have not been updated to the previously stored firmware image (250), then the method of FIG. 3 continues by not updating (312) the hypervisor-hosted firmware image (250). The hypervisor may be configured to retry the update after a predefined period of time.

If, however, all of the adapters have been updated to the previously stored firmware image (250), the method of FIG. 3 continues by updating (308) the hypervisor-hosted firmware image. In the method of FIG. 3, updating (308) the hypervisor-hosted firmware image may be carried out by replacing (310), in the reserved memory space (248), the previously stored firmware image with the replacement firmware image. In some embodiments, the hypervisor may take an exclusive lock that, once taken, disables adjunct partitions from updating firmware. In this way, during the replacement of the previously-stored hypervisor-hosted firmware with the replacement firmware, the adjunct partitions will not be able to copy the hypervisor hosted firmware from the hypervisor to the network adapters as such a copy may result in a copy of incomplete data or an incorrect firmware image.

Figure 4:
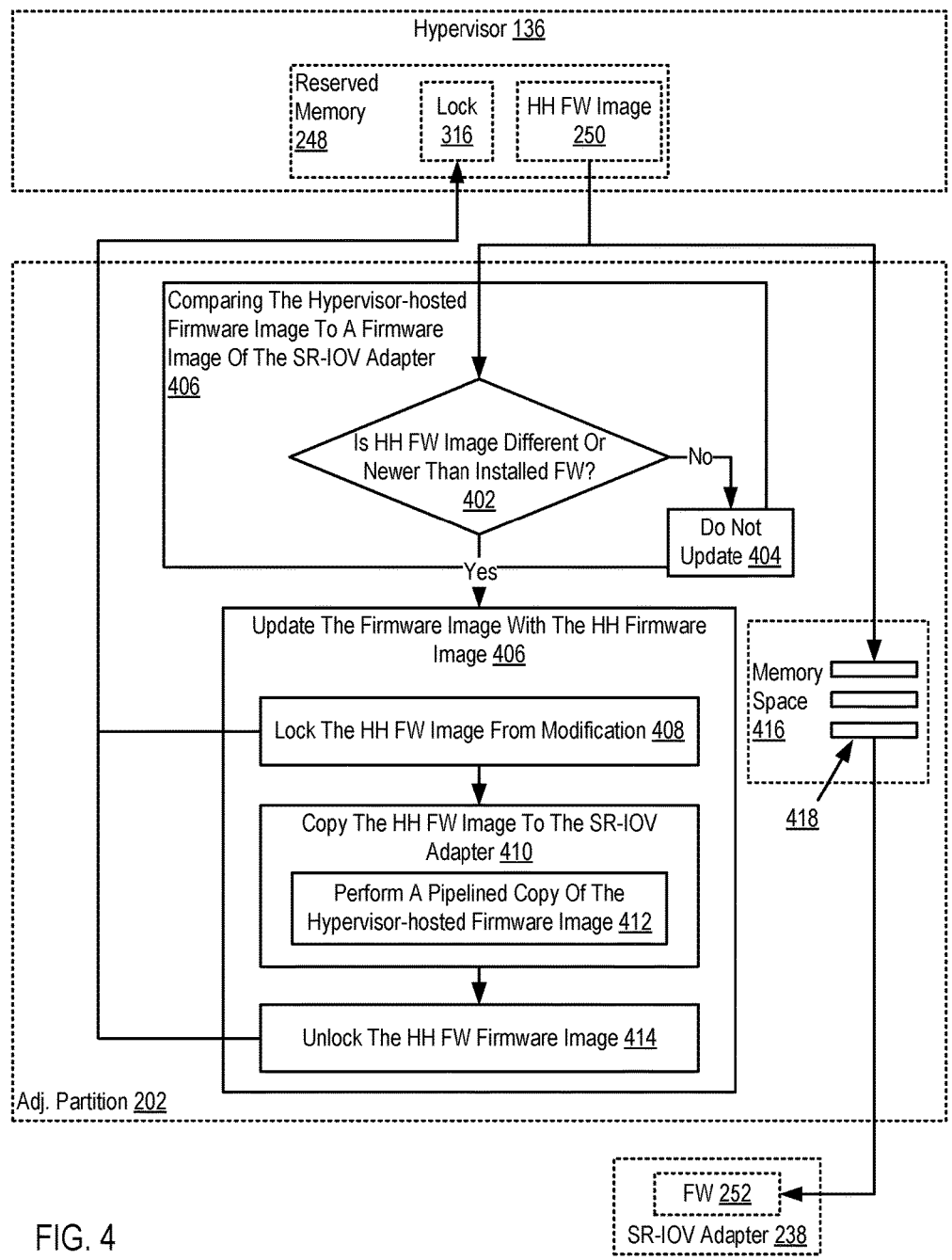
FIG. 4 sets forth a flow chart illustrating another example method for firmware management of SR-IOV adapters in a computing system according to embodiments of the present disclosure.

For further explanation, FIG. 4 sets forth a flow chart illustrating an example method, carried out by an adjunct partition, of firmware management of SR-IOV adapters in a computing system according to embodiments of the present disclosure. The method of FIG. 4 may be carried out as part of the method of FIG. 3, before, after, or in parallel with the method of FIG. 3.

Although not depicted in the example of FIG. 4, readers will understand that the prior to comparing (406), by an SR-IOV driver executing in an adjunct partition associated with an SR-IOV adapter of the computing system, the hypervisor-hosted firmware image to a firmware image installed on the SR-IOV adapter associated with the adjunct partition, the adjunct partition (202) may determine whether the hypervisor holds an exclusive lock disabling the adjunct partition from updating the firmware of the SR-IOV adapter. As explained above, during the update of the hypervisor-hosted firmware image, the hypervisor may take such a lock. The adjunct partition (202) may cease an attempt to update the firmware image when such a lock is taken by the hypervisor and discovered by the adjunct partition. If such a lock is not taken at the time the adjunct partition begins an attempt to update the firmware of the SR-IOV adapter, the adjunct may continue the update process.

To that end, the method of FIG. 4 includes comparing (406), by an SR-IOV driver executing in an adjunct partition associated with an SR-IOV adapter of the computing system, the hypervisor-hosted firmware image to a firmware image installed on the SR-IOV adapter associated with the adjunct partition. Such a comparison may be carried out at various times. For example, such a comparison (406) may be carried out by at adapter initialization time, periodically by polling the hypervisor through a hypervisor system call, or responsive to a user request.

Such comparison may be carried out by determining (402) whether the hypervisor-hosted firmware image is different or newer than the firmware image installed on the SR-IOV adapter. Such 'newer or different' criteria is referred to in this specification as "predefined update criteria." As mentioned above, the comparison of the hypervisor-hosted firmware image to the firmware image installed on the SR-IOV adapter (238) may meet various predefined update criteria. In some embodiments, the predefined update criteria may specify that the hypervisor-hosted firmware image must be a newer version than the firmware image (252) installed on the SR-IOV adapter (238). In other embodiments, the predefined update criteria may specify any version different than the version in installed on the SR-IOV adapter.

If the hypervisor-hosted firmware image is neither different nor newer than the firmware image (252) installed on the SR-IOV adapter (238), then the method of FIG. 4 continues by not updating (404) the firmware installed on the SR-IOV adapter. If the comparison meets predefined update criteria, the method of FIG. 4 continues by updating (406) the firmware image of the SR-IOV adapter associated with the adjunct partition with the hypervisor-hosted firmware image.

In the method of FIG. 4 updating (306) the firmware image (252) with the hypervisor-hosted firmware image (250) includes locking (408) the hypervisor-hosted firmware image from modification through a first hypervisor system call. Locking the hypervisor-hosted firmware may be carried out through a first hypervisor system call from a driver in the adjunct partition (202). The hypervisor system call may set a value of a flag upon receipt of the instruction and return an acknowledgement to the requesting driver. Readers of skill in the art will recognize that locking (408) the hypervisor-hosted firmware image may be carried out through use of a non-exclusive lock. The non-exclusivity of the lock enables multiple adjunct partitions to perform an update of SR-IOV firmware in parallel while the hypervisor, upon discovering the lock being held by any adjunct partition, is prohibited to replace the hypervisor-hosted firmware image.

Updating (406) the firmware image also includes copying (410) the hypervisor-hosted firmware image to the SR-IOV adapter. In the example of FIG. 4, copying (410) the hypervisor-hosted firmware image to the SR-IOV adapter is carried out by performing (412) a pipelined copy of the hypervisor-hosted firmware image (250) to the SR-IOV adapter (238) through a memory space (416) of the adjunct partition (202). That is, in some embodiments such a copy may be carried out in a pipelined fashioned, where only a subset of memory pages (418) forming the hypervisor-hosted firmware image are copied into a predefined memory space (416) of the adjunct partition then to the adapter before a next subset of memory pages is copied into the memory space (416). In this way, the adjunct partition need not be as large as the entire space required to store the firmware image. Instead, the adjunct partition may be smaller than the size required to store the firmware image and only copy through the adjunct partition at any given time, a small portion of the firmware image.

Upon completing the copying (410) of the firmware image to the SR-IOV adapter (238), the method of FIG. 4 continues by unlocking (414) the hypervisor-hosted firmware image (250) from modification through a second hypervisor system call.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory) (134), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of firmware management of SR-IOV (single-root I/O virtualization) adapters in a computing system, the method comprising:
   receiving, by a hypervisor, a request to update a hypervisor-hosted firmware image including replacing a firmware image previously stored in a reserved memory space of the hypervisor with a replacement firmware image, wherein the hypervisor-hosted firmware image comprises only an SR-IOV adapter firmware image configured for installation on SR-IOV adapters of a particular type;
   updating the hypervisor-hosted firmware image, including replacing, in the reserved memory space, the previously stored firmware image with the replacement firmware image; and
   updating the firmware image of the SR-IOV adapter associated with an adjunct partition with the hypervisor-hosted firmware image including performing a pipelined copy of the hypervisor-hosted firmware image to the SR-IOV adapter through a predefined memory space of the adjunct partition, wherein performing the pipelined copy of the hypervisor-hosted firmware image to the SR-IOV adapter through the predefined memory space of the adjunct partition comprises copying only a subset of memory pages forming the hypervisor-hosted firmware image into the predefined memory space of the adjunct partition then to the adapter before a next subset of memory pages is copied into the predefined memory space, wherein the size of the memory space of the adjunct partition is less than the size of the hypervisor-hosted firmware image.

2. The method of claim 1, further comprising determining whether all SR-IOV adapters of the particular type in the computing system have been updated to the previously stored firmware image wherein updating the hypervisor-hosted firmware image further comprises updating the hypervisor-hosted firmware image only if all SR-IOV adapters of the particular type in the computing system have been updated to the previously stored firmware image.

3. The method of claim 1, wherein updating the hypervisor-hosted firmware image further comprises updating the hypervisor-hosted firmware image only if no adjunct partition in the computing system has locked the hypervisor-hosted firmware image from modification.

4. The method of claim 3, wherein updating the firmware image of the SR-IOV adapter associated with the adjunct partition with the hypervisor-hosted firmware image further comprising:
   locking the hypervisor-hosted firmware image from modification through a first hypervisor system call;
   copying the hypervisor-hosted firmware image to the SR-IOV adapter; and
   upon completing the copying of the firmware image to the SR-IOV adapter, unlocking the hypervisor-hosted firmware image from modification through a second hypervisor system call.

5. The method of claim 1 further comprising:
   comparing, by an SR-IOV driver executing in an adjunct partition associated with an SR-IOV adapter of the computing system, the hypervisor-hosted firmware image to a firmware image installed on the SR-IOV adapter associated with the adjunct partition; and
   if the comparison meets predefined update criteria, updating the firmware image of the SR-IOV adapter associated with the adjunct partition with the hypervisor-hosted firmware image.

6. The method of claim 5 wherein comparing the hypervisor-hosted firmware image to a firmware image installed on the SR-IOV adapter associated with the adjunct partition further comprises comparing the hypervisor-hosted firmware image to the firmware image installed on the SR-IOV adapter associated with the adjunct partition at adapter initialization time.

7. The method of claim 5 wherein comparing the hypervisor-hosted firmware image to a firmware image installed on the SR-IOV adapter associated with the adjunct partition further comprises periodically polling the hypervisor through a hypervisor system call.

8. The method of claim 5 wherein comparing the hypervisor-hosted firmware image to a firmware image installed on the SR-IOV adapter associated with the adjunct partition further comprises performing the comparison responsive to a user request.

9. The method of claim 5 wherein the comparison meets predefined update criteria when the firmware image of the SR-IOV adapter is different than the hypervisor-hosted firmware image.

10. The method of claim 5 wherein the comparison meets predefined update criteria when the hypervisor-hosted firmware image is newer than the firmware image of the SR-IOV adapter.

11. An apparatus for firmware management of SR-IOV (single-root I/O virtualization) adapters in a computing system, the apparatus comprising a computer processor, a computer memory operatively coupled to the computer processor, the computer memory having disposed within it computer program instructions that, when executed by the computer processor, cause the apparatus to carry out:
   receiving, by a hypervisor, a request to update a hypervisor-hosted firmware image including replacing a firmware image previously stored in a reserved memory space of the hypervisor with a replacement firmware image, wherein the hypervisor-hosted firmware image comprises only an SR-IOV adapter firmware image configured for installation on SR-IOV adapters of a particular type;
   updating the hypervisor-hosted firmware image, including replacing, in the reserved memory space, the previously stored firmware image with the replacement firmware image; and
   updating the firmware image of the SR-IOV adapter associated with an adjunct partition with the hypervisor-hosted firmware image including performing a pipelined copy of the hypervisor-hosted firmware image to the SR-IOV adapter through a predefined memory space of the adjunct partition, wherein performing the pipelined copy of the hypervisor-hosted firmware image to the SR-IOV adapter through the predefined memory space of the adjunct partition comprises copying only a subset of memory pages forming the hypervisor-hosted firmware image into the predefined memory space of the adjunct partition then to the adapter before a next subset of memory pages is copied into the predefined memory space, wherein the size of the memory space of the adjunct partition is less than the size of the hypervisor-hosted firmware image.

12. The apparatus of claim 11, further comprising computer program instructions that, when executed, cause the apparatus to carry out:
   determining whether all SR-IOV adapters of the particular type in the computing system have been updated to the previously stored firmware image wherein updating the hypervisor-hosted firmware image further comprises updating the hypervisor-hosted firmware image only if all SR-IOV adapters of the particular type in the computing system have been updated to the previously stored firmware image.

13. The apparatus of claim 11, wherein updating the hypervisor-hosted firmware image further comprises updating the hypervisor-hosted firmware image only if no adjunct partition in the computing system has locked the hypervisor-hosted firmware image from modification.

14. The apparatus of claim 11 further comprising computer program instructions that, when executed by the computer processor, cause the apparatus to carry out:
   comparing, by an SR-IOV driver executing in an adjunct partition associated with an SR-IOV adapter of the computing system, the hypervisor-hosted firmware image to a firmware image installed on the SR-IOV adapter associated with the adjunct partition; and
   if the comparison meets predefined update criteria, updating the firmware image of the SR-IOV adapter associated with the adjunct partition with the hypervisor-hosted firmware image.

15. A computer program product for firmware management of SR-IOV (single-root I/O virtualization) adapters in a computing system, the computer program product disposed upon a non-transitory computer readable medium, the computer program product comprising computer program instructions that, when executed, cause a computer to carry out:
   receiving, by a hypervisor, a request to update a hypervisor-hosted firmware image including replacing a firmware image previously stored in a reserved memory space of the hypervisor with a replacement firmware image, wherein the hypervisor-hosted firmware image comprises only an SR-IOV adapter firmware image configured for installation on SR-IOV adapters of a particular type;
   updating the hypervisor-hosted firmware image, including replacing, in the reserved memory space, the previously stored firmware image with the replacement firmware image; and
   updating the firmware image of the SR-IOV adapter associated with an adjunct partition with the hypervisor-hosted firmware image including performing a pipelined copy of the hypervisor-hosted firmware image to the SR-IOV adapter through a predefined memory space of the adjunct partition, wherein performing the pipelined copy of the hypervisor-hosted firmware image to the SR-IOV adapter through the predefined memory space of the adjunct partition comprises copying only a subset of memory pages forming the hypervisor-hosted firmware image into the predefined memory space of the adjunct partition then to the adapter before a next subset of memory pages is copied into the predefined memory space, wherein the size of the memory space of the adjunct partition is less than the size of the hypervisor-hosted firmware image.

16. The computer program product of claim 15, further comprising computer program instructions that, when executed, cause the computer to carry out:
   determining whether all SR-IOV adapters of the particular type in the computing system have been updated to the previously stored firmware image wherein updating the hypervisor-hosted firmware image further comprises updating the hypervisor-hosted firmware image only if all SR-IOV adapters of the particular type in the computing system have been updated to the previously stored firmware image.

17. The computer program product of claim 15, wherein updating the hypervisor-hosted firmware image further comprises updating the hypervisor-hosted firmware image only if no adjunct partition in the computing system has locked the hypervisor-hosted firmware image from modification.

18. The computer program product of claim 15 further comprising computer program instructions that, when executed, cause a computer to carry out:
   comparing, by an SR-IOV driver executing in an adjunct partition associated with an SR-IOV adapter of the computing system, the hypervisor-hosted firmware image to a firmware image installed on the SR-IOV adapter associated with the adjunct partition; and if the comparison meets predefined update criteria, updating the firmware image of the SR-IOV adapter associated with the adjunct partition with the hypervisor-hosted firmware image.

\* \* \* \* \*